(12) United States Patent
Tao

(10) Patent No.: US 12,085,226 B2
(45) Date of Patent: Sep. 10, 2024

(54) AUDIOVISUAL DEVICE SUPPORT AND HANGING PLATE ASSEMBLY THEREOF

(71) Applicant: NINGBO SOMLE AUDIO-VISUAL TECHNOLOGY CO., LTD, Ningbo (CN)

(72) Inventor: Liming Tao, Ningbo (CN)

(73) Assignee: NINGBO SOMLE AUDIO-VISUAL TECHNOLOGY CO., LTD, Ningbo (CN)

( * ) Notice: Subject to any disclaimer, the term of this patent is extended or adjusted under 35 U.S.C. 154(b) by 52 days.

(21) Appl. No.: 18/097,517

(22) Filed: Jan. 17, 2023

(65) Prior Publication Data

US 2023/0167944 A1 Jun. 1, 2023

(30) Foreign Application Priority Data

Sep. 1, 2022 (CN) .......................... 202222347074.5

(51) Int. Cl.
*F16M 13/02* (2006.01)
(52) U.S. Cl.
CPC ................................. *F16M 13/022* (2013.01)
(58) Field of Classification Search
CPC .... F16M 13/022; F16M 11/42; F16M 11/041; F16M 11/046
See application file for complete search history.

(56) References Cited

U.S. PATENT DOCUMENTS

| 11,712,116 B1* | 8/2023 | Kim ........................ | F16M 13/02 |
| | | | 248/277.1 |
| 2011/0162017 A1 | 6/2011 | Dodd | |
| 2011/0162018 A1 | 6/2011 | Dodd | |
| 2017/0102108 A1* | 4/2017 | Baker .................... | H04N 5/655 |
| 2019/0179609 A1 | 6/2019 | Zielinski et al. | |
| 2020/0182395 A1* | 6/2020 | Rao ........................ | F16M 11/10 |
| 2020/0240575 A1* | 7/2020 | Lee ........................ | F16M 13/022 |
| 2020/0347986 A1* | 11/2020 | Xiang .................. | A47B 83/001 |
| 2021/0247018 A1* | 8/2021 | Yamada ............... | H05K 5/0204 |
| 2022/0022647 A1* | 1/2022 | Carral O Gorman . | F16M 11/42 |

* cited by examiner

Primary Examiner — Amy J. Sterling

(57) ABSTRACT

The present invention discloses an audiovisual device support and a hanging plate assembly thereof. In the present invention, a fit state between a first hanging plate and a second hanging plate which are arranged detachably relative to each other is adjusted to adjust a fixing height of an audiovisual device relative to a support surface so as to meet diverse use requirements, and the first hanging plate and the second hanging plate are locked relative to each other by a second fixture after being adjusted to a desired height, so that the audiovisual device and the support or the hanging plate assembly are formed as a firmly connected whole.

20 Claims, 10 Drawing Sheets

AUDIOVISUAL DEVICE SUPPORT AND HANGING PLATE ASSEMBLY THEREOF

The present application claims priority under 35 USC § 119(e), and 37 CFR § 1.55 to co-pending and commonly owned Chinese Patent Application No. 202222347074.5 filed on Sep. 1, 2022, the entirety of which is incorporated by reference herein.

TECHNICAL FIELD

The present invention belongs to the field of device supports. It particularly relates to a rack for an audiovisual device such as a television and a hanging plate assembly for audiovisual device support.

BACKGROUND

Audiovisual devices are commonly used in daily life and work, such as liquid crystal televisions, and are increasingly used in office conference displays in addition to home viewing. In the case of home television, a television cabinet or a television fixation support is generally reserved for mounting a television. However, office conference rooms generally do not have such a design, and audiovisual devices are mostly fixed by supports. Of course, the supports may also be applied to fixation of home televisions.

Existing television supports generally have fixed mounting heights, which cannot fully meet the use requirements of various places. Therefore, some height adjustable supports have been created. For example, Chinese invention patent CN214198048U discloses a television rack with a support height adjustment function, which realizes height adjustment of a television by means of an upper support column and a lower support column which are telescopically movable and fixed. Chinese invention patent CN212960713U discloses a television support capable of adjusting height and angle of a television, where height of the television is adjusted by moving a movable rod up and down through rotation of a threaded structure.

The above height adjustment structures are relatively complicated and costly, and stability of the overall height adjustment mechanisms is poor at a high position.

SUMMARY

The present invention aims to provide an audiovisual device support which is easy to mount and has a height adjustment function, and a hanging plate assembly applied to the audiovisual device support.

The audiovisual device support and the hanging plate assembly thereof of the present invention realize adjustment of a fixing height of an audiovisual device relative to a support surface by adjusting a fit state between a first hanging plate and a second hanging plate which are arranged detachably relative to each other, so as to meet diverse requirements in practical application. Furthermore, after being adjusted to a desired height, locking between the first hanging plate and the second hanging plate can be performed by a second fixture, so that the audiovisual device and the support or the hanging plate assembly are formed as a firmly connected whole, and force in any three-dimensional direction cannot separate them, so as to achieve the purpose of firm fixation.

Furthermore, the second hanging plate is arranged detachably connected relative to the first hanging plate, which also facilitates mounting of the audiovisual device. That is, the second hanging plate is detached and fixed to the audiovisual device, then the audiovisual device with the second hanging plate fixed is fitted to a support frame with the first hanging plate, and after the fit state is adjusted until the height of the audiovisual device meets the requirements, the second hanging plate is locked relative to the first hanging plate by the second fixture, thereby completing mounting process of the audiovisual device.

When the fixing height of the audiovisual setting needs to be adjusted, the locking between the two hanging plates by the second fixture is released, and then the fit state between the two hanging plates is adjusted to adjust the fixing height of the audiovisual device, and finally the second fixture is fitted in place.

Figure 1:
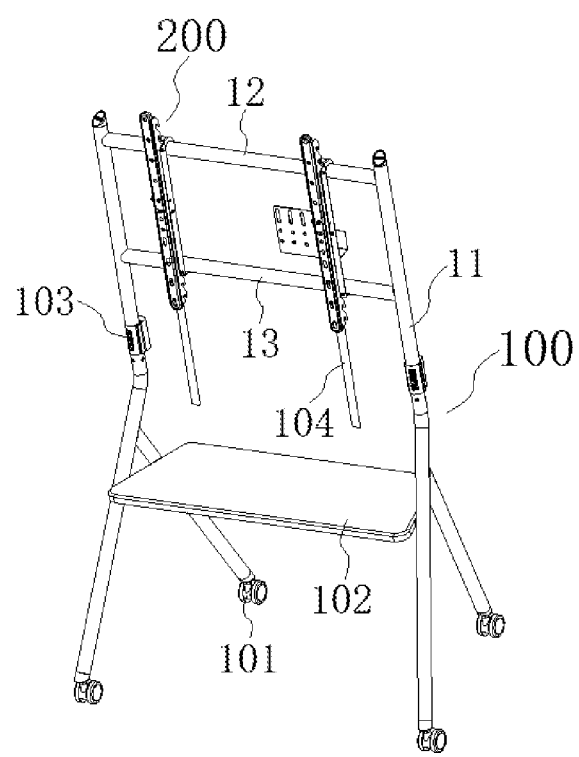
FIG. 1 is a three-dimensional structural diagram of a front side of an audiovisual device support according to an embodiment of the present invention.

Reference numerals in the drawings are as follows: 100. support frame, 200. hanging plate assembly, 11. upright column, 12. upper cross bar, 13. lower cross bar, 101. moving wheel, 102. object storage plate, 103. wire receiving member, 104. scale, 105. auxiliary support, 131 third fixing hole, 21. first hanging plate, 22. second hanging plate, 211. first hanging plate body, 212. upper fixture, 213. lower fixture, 214. hook portion, 215. hanging column, 201. first fixture, 202. first connecting wing, 203. first folding wing, 204. hanging column fixing hole, 205. locking hole, 206. second fixture, 221. second connecting wing, 222. second folding wing, 223. hanging hole, 224. first fixing hole, 225. second fixing hole, 226. communicating hole, 227. limiting hole, 228. locking limiting wall.

DESCRIPTION OF THE EMBODIMENTS

In order to make those skilled in the art better understand the present invention and thus define the scope of the present invention more clearly, the present invention is described below in detail with reference to certain specific embodiments of the present invention. It should be noted that the following description only illustrates some implementations of the inventive concept and part of embodiments of the present invention, specific direct description of related structures is merely for the convenience of understanding the present invention, and the specific features do not, of course and directly limit the scope of implementation of the present invention. Conventional choices and substitutions made by those skilled in the art under the guidance of the inventive concept should be considered within the scope of the present invention.

An audiovisual device support, comprises a support frame 100 and a hanging plate assembly 200, the hanging plate assembly 200 comprises a first hanging plate 21 and a second hanging plate 22 which are detachably connected, the first hanging plate 21 is fixed to the support frame 100, and the second hanging plate 22 is connected with an audiovisual device. The first hanging plate 21 is provided with a first connecting portion, the second hanging plate 22 is provided with at least two sets of second connecting portions along a length direction thereof, the second connecting portions fit with the first connecting portion to connect the second hanging plate 22 to the first hanging plate 21, and different second connecting portions are fitted to the first connecting portion to make the second hanging plate 22 have different fixing heights relative to the first hanging plate 212, thereby achieving the purpose of adjusting the fixing height of the audiovisual device.

A hanging plate assembly for an audiovisual device support has a structure the same as that of the hanging plate assembly 200 described above.

Embodiment 1

An audiovisual device support to fix an audiovisual device, such as a television, thereto serves to fix and support an audiovisual device such as a television.

As shown in FIGS. 1 to 7, the audiovisual device support is integrally composed of a support frame 100 and a hanging plate assembly 200, the hanging plate assembly 200 is used to be fixed to the audiovisual device, and the support frame 100 is used to provide a frame body.

The support frame 100 comprises upright columns 11 vertically arranged, lower ends thereof are in contact with a support surface, such as the ground, and upper ends thereof extend upwards to increase height. The upright columns 11 can be arranged vertically or nearly vertically, and can also be partially curved. Furthermore, the upright columns 11 can be formed by assembling a plurality of components, and bottoms thereof have a shape conducive to vertical stability. For example, the bottoms of the upright columns 11 shown in the present embodiment has two legs.

In the present embodiment, there are two upright columns 11 arranged at intervals, and two cross bars are horizontally arranged between the two upright columns 11, including an upper cross bar 12 and a lower cross bar 13, and the upper and lower cross bars 12, 13 are also arranged at intervals. A spacing distance between the two upright columns 11 can be set as required to accommodate audiovisual devices with different sizes or widths.

In the present embodiment, lower portions of the upright columns 11 are further provided with object storage plates 102 for storing objects. The upright columns 11 are further provided with several wire receiving members 103 for receiving wires such as a power line and a signal line therein so as to avoid mess of the wires. In addition, the bottoms of the upright columns 11 are provided with moving wheels 101 to facilitate overall movement of the support, and the moving wheels 101 preferably also have locking mechanisms. The moving wheels and the moving wheels having the locking mechanisms may use known structures.

Figure 4:
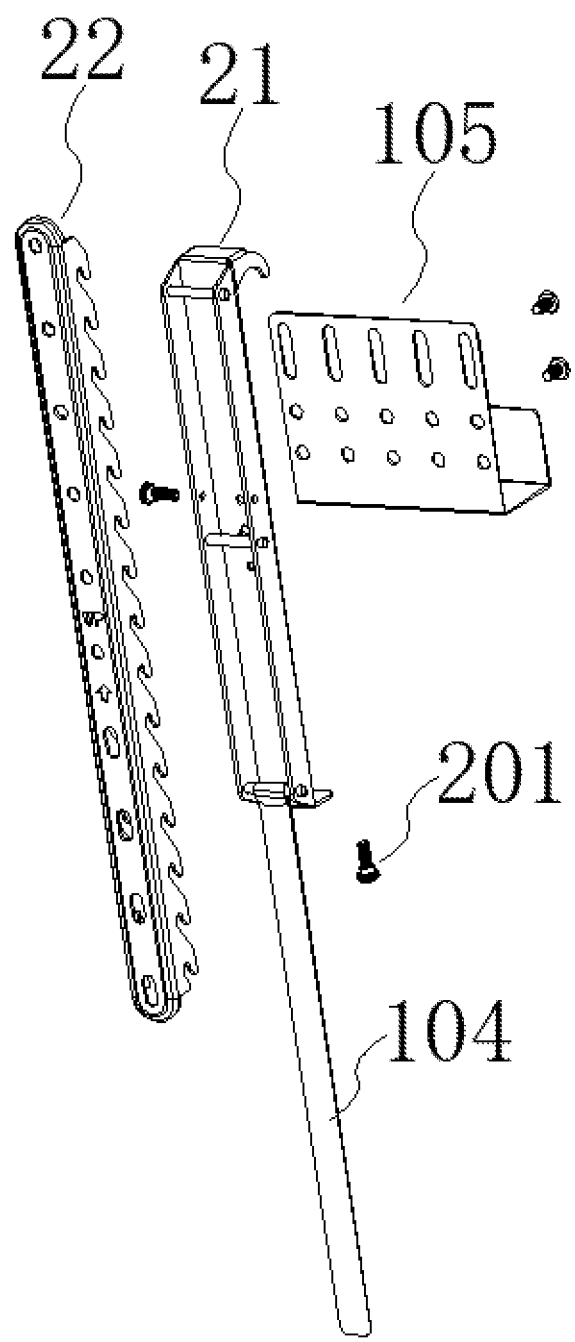
FIG. 4 is a structural exploded view of one of the hanging plate assemblies of the audiovisual device support according to the embodiment of FIG. 1.

As shown in FIG. 4, the hanging plate assembly 200 comprises a first hanging plate 21 and a second hanging plate 22 which are detachably connected to each other, the first hanging plate 21 is used to be fixed to the support frame 100, and the second hanging plate 22 is used to be fixed to the audiovisual device, and a fit height between the first hanging plate 21 and the second hanging plate 22 is adjustable, achieving the purpose of adjusting a fixing height of the audiovisual device on the support.

Figure 5:
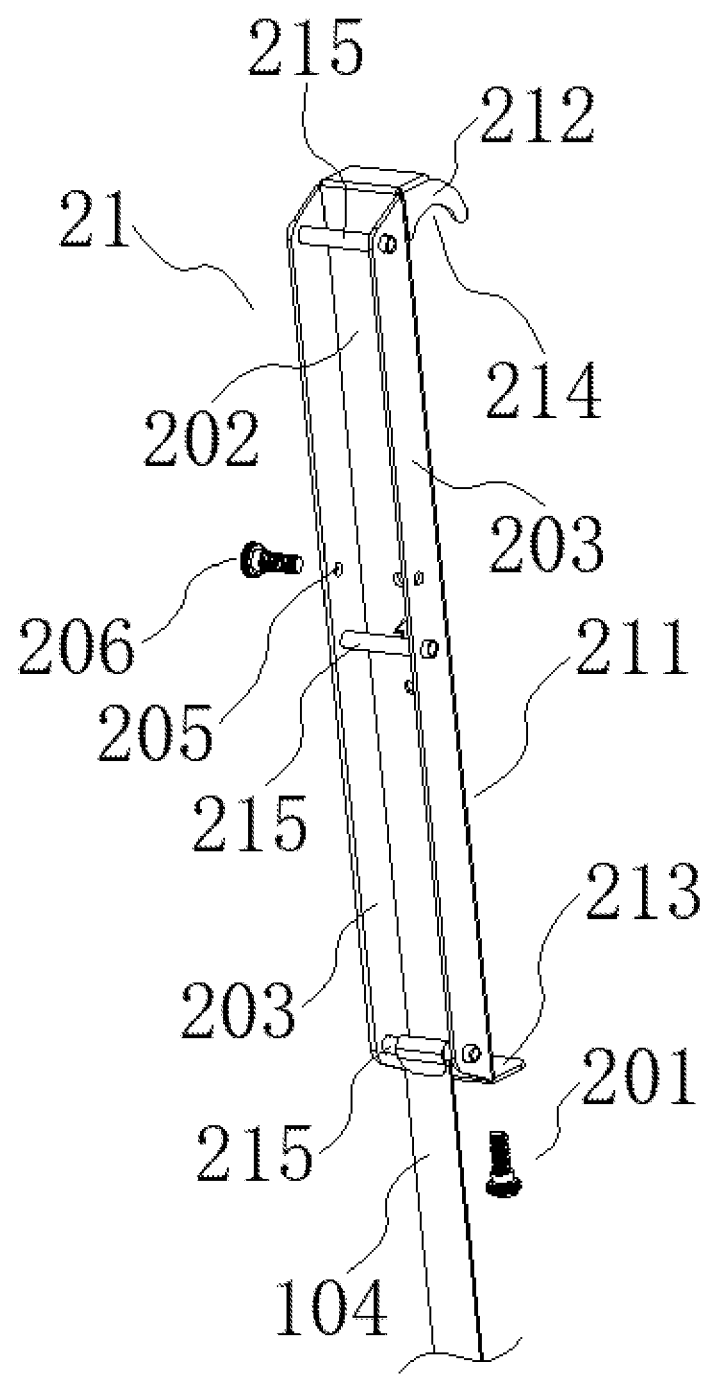
FIG. 5 is a structural diagram of a first hanging plate in the hanging plate assembly of FIG. 4.

As shown in FIG. 5, the first hanging plate 21 comprises an elongated first hanging plate body 211, an upper fixture 212 for fitting to the upper cross bar 12 is provided near an upper end thereof, and a lower fixture 213 for fitting to the lower cross bar 13 is provided near a lower end thereof, so as to fix the first hanging plate body 211 to the upper cross bar 12 and the lower cross bar 13, achieving the purpose of connecting the hanging plate assembly 200 with the support frame 100.

A hook portion 214 is provided at the upper fixture 212 to hook the upper cross bar 12; the lower fixture 213 is fitted to the lower cross bar 13 to fix the first hanging plate 21 to the two cross bars. In the present embodiment, the lower fixture 213 is a crosspiece fitted to the lower end of the lower cross bar 13, and is fixed into a third fixing hole 131 of the lower fixture 213 by a first fixture 201. The first fixture 201 is a screw.

In other embodiments, the lower fixture 213 may be fixed to the lower cross bar 12 by other structures, such as a clip.

In the present embodiment, the first hanging plate body 211 comprises a first connecting wing 202 and first folding wings 203 located on both sides thereof. The first hanging plate body 211 can be obtained by bending a sheet-shaped base material, that is, both sides of the base material are bent to form the first folding wings 203, and the unbent middle portion is formed as the first connecting wing 202.

Hanging columns 215 are provided between the two first folding wings 203 to serve as first connecting portions, and there are several hanging columns 215 which are successively arranged at intervals from top to bottom. Both ends of the hanging columns 215 are fixed to the first folding wings 203, formed as components for the second hanging plate 22 to fit therewith and adjusting height. In the present embodiment, there are three hanging columns 215 which are respectively arranged at an upper end, a middle portion and a lower end of the first hanging plate body 211 to provide a stable hanging holding force. Also, the hanging columns 215 can stabilize the first folding wings 203, making the first hanging plate body 211 structurally strong.

Figure 6:
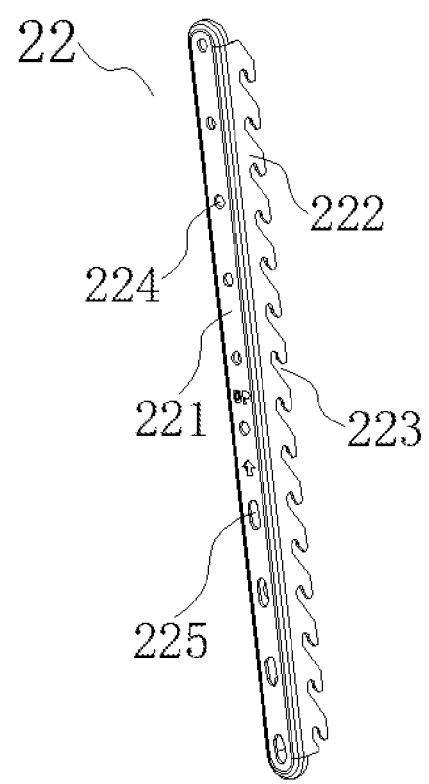
FIG. 6 is a structural diagram of a second hanging plate in the hanging plate assembly of FIG. 4.

As shown in FIG. 6, the second hanging plate 22 comprises a second connecting wing 221 and second folding wings 222 located on both sides thereof. In the present embodiment, the second hanging plate 22 is made of a metal plate, both sides thereof are bent to form the second folding wings 222, and the unbent middle portion is formed as the second connecting wing 221, thus forming the second hanging plate 22.

The second connecting wing 221 is provided with several first fixing holes 224 and second fixing holes 225 which are arranged at intervals, the first fixing holes 224 are circular through holes for a screw to pass through for fixing, and the second fixing holes 225 are elongated through holes for a screw to pass through for fixing and can allow position of the screw to be adjusted up and down therein so as to fix different brands or sizes of devices.

Figure 7:
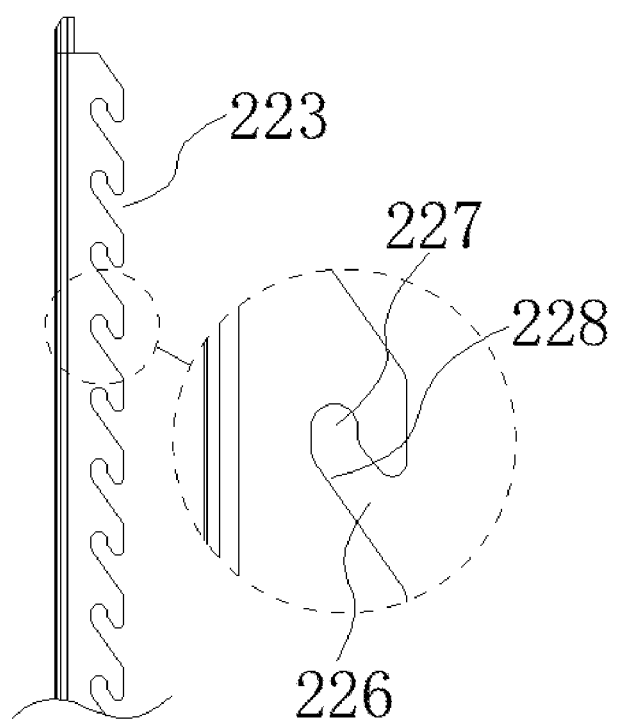
FIG. 7 is a side view of the second hanging plate of FIG. 6 and a partially enlarged view thereof.
Figure 8:
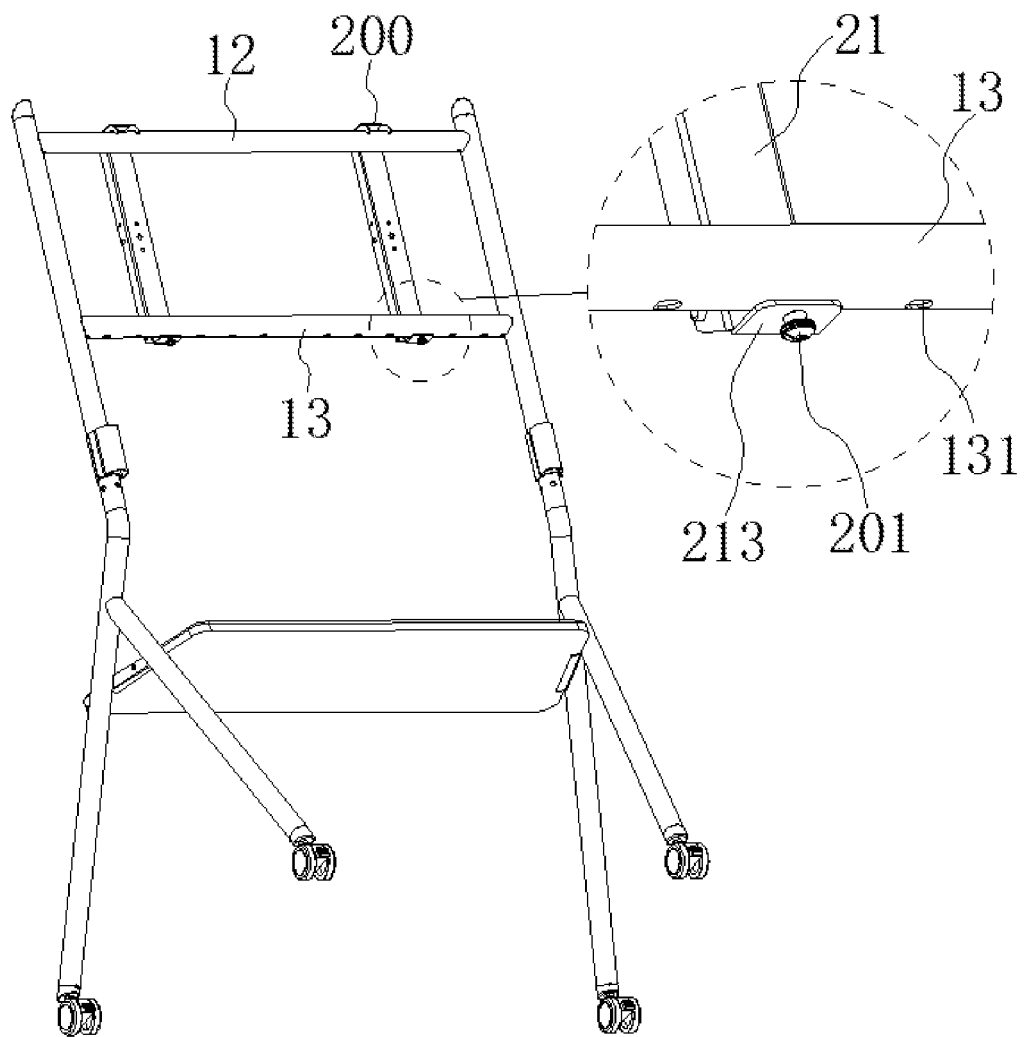
FIG. 8 is a schematic diagram showing fit between the first hanging plate of FIG. 5 and a support frame and a partially enlarged view thereof.

As shown in FIGS. 6 and 7, several hanging holes 223 are provided at intervals on the second folding wings 222 to serve as second connecting portions, the hanging holes 223 allow the hanging columns 215 to fit therein so as to hang the second hanging plate 22 on the first hanging plate 21. The hanging holes 223 comprise communicating holes 226 and limiting holes 227, the communicating holes 226 are obliquely arranged on the second folding wings 222, outer ends thereof are formed as openings of the hanging holes 223, and inner ends thereof are in communication with the limiting holes 227; and the limiting holes 227 are arranged on the second folding wings 222. To realize fit, the hanging columns 215 enter the communicating holes 226 and then are displaced into the limiting holes 227 to fit the second hanging plate 22 into the first hanging plate 21. In other words, one end of the respective limiting hole 227 is arranged closed, the other end thereof is in communication with the outside through the communicating holes 226, and the hanging columns 215 are fitted into the limiting holes 227 after passing through the communicating holes 226 to connect the second hanging plate 22 to the first hanging plate 21.

In the present embodiment, the limiting holes 227 are vertically arranged. In other embodiments, the limiting holes 227 may be obliquely arranged.

In the present embodiment, external dimensions of the two second folding wings 222 are less than or equal to internal dimensions of the two first folding wings 203 to allow the second hanging plate 22 to be accommodated within the first hanging plate 21.

In the present embodiment, lower ends of the two hanging plate assemblies 200 are further provided with scales 104, the scales 104 are provided with graduations, one end of each scale is fixed to the hanging columns 215 located at the lower end of the first hanging plate body 211, and the other end thereof is vacant.

Figure 2:
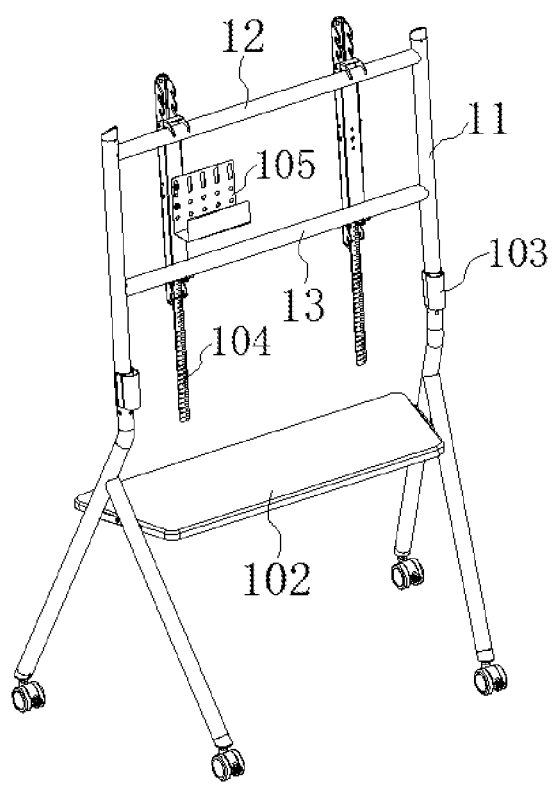
FIG. 2 is a three-dimensional structural diagram of a rear side of the audiovisual device support according to the embodiment of FIG. 1.
Figure 3:
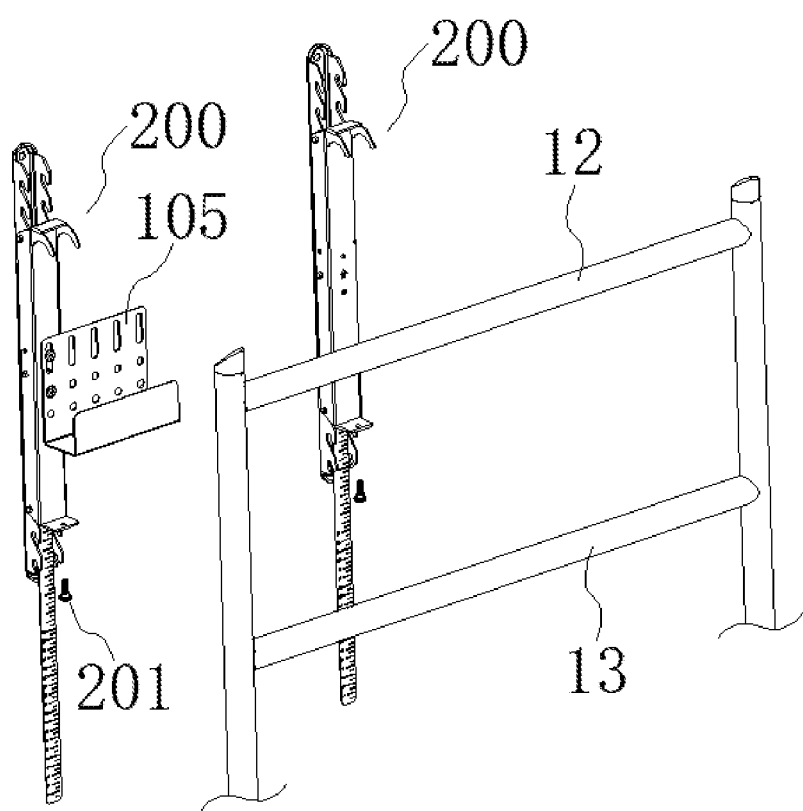
FIG. 3 is an exploded view of a partial structure of FIG. 2.

As shown in FIGS. 2 and 3, in the present embodiment, the support further comprises an auxiliary support 105 fixed to one of the hanging plate assemblies 200, more specifically, to a back surface of the first hanging plate 21 of one of the hanging plate assemblies 200, for housing auxiliary devices such as a set-top box and a remote controller.

As shown in FIGS. 5, 7 and 9-10, in order to lock the second hanging plate 22 with the first hanging plate 21 to prevent the audiovisual device fixed to the second hanging plate 22 from falling off, the support further comprises a second fixture 206. The second fixture 206 is fitted into the hanging holes 223 after passing through locking holes 205 arranged on the first folding wings 203, so that the second fixture 206 is fitted with the hanging columns 215 to fix the second hanging plate 22 and the first hanging plate 21. The second fixture 206 is a screw thread fitted into the locking holes 205.

As shown in FIG. 7, junctions between the communicating holes 226 and the limiting holes 227 of the hanging holes 223 are formed as locking limiting walls 228, and after the second fixture 206 is fitted into the hanging columns 215, a lower wall of the second fixture 206 abuts against the locking limiting walls 228.

Therefore, in the present embodiment, use of the hanging holes 223 and the limiting holes 227 make the second hanging plate 22 only displaced upwards relative to the first hanging plate 21 and keep still in the remaining three directions. The second fixture 206 fits with the locking limiting walls 228 to lock the upward displacement between the second hanging plate 22 and the first hanging plate 21, thereby completely locking the second hanging plate 22 and the first hanging plate 21.

Figure 9:
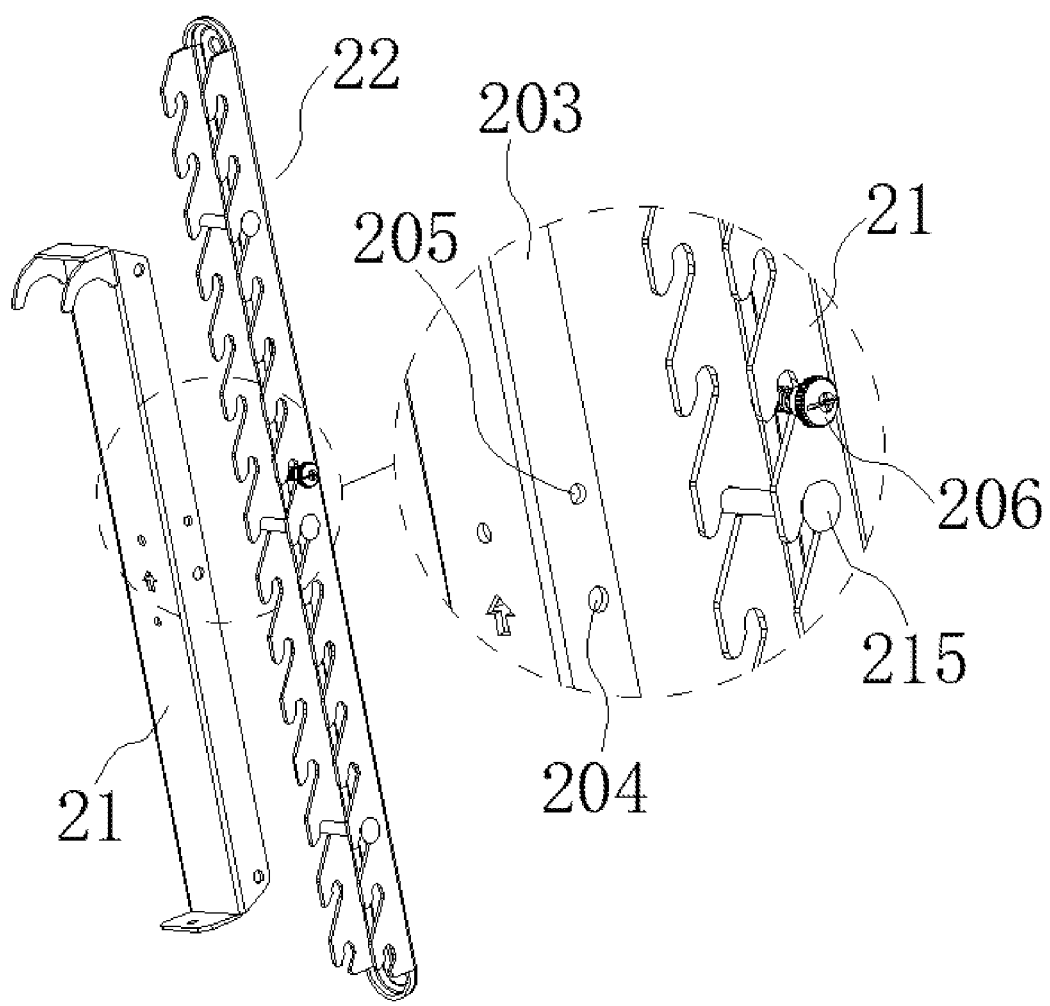
FIG. 9 is an exploded view showing fit between the first hanging plate and the second hanging plate according to the embodiment of FIG. 1.
Figure 10:
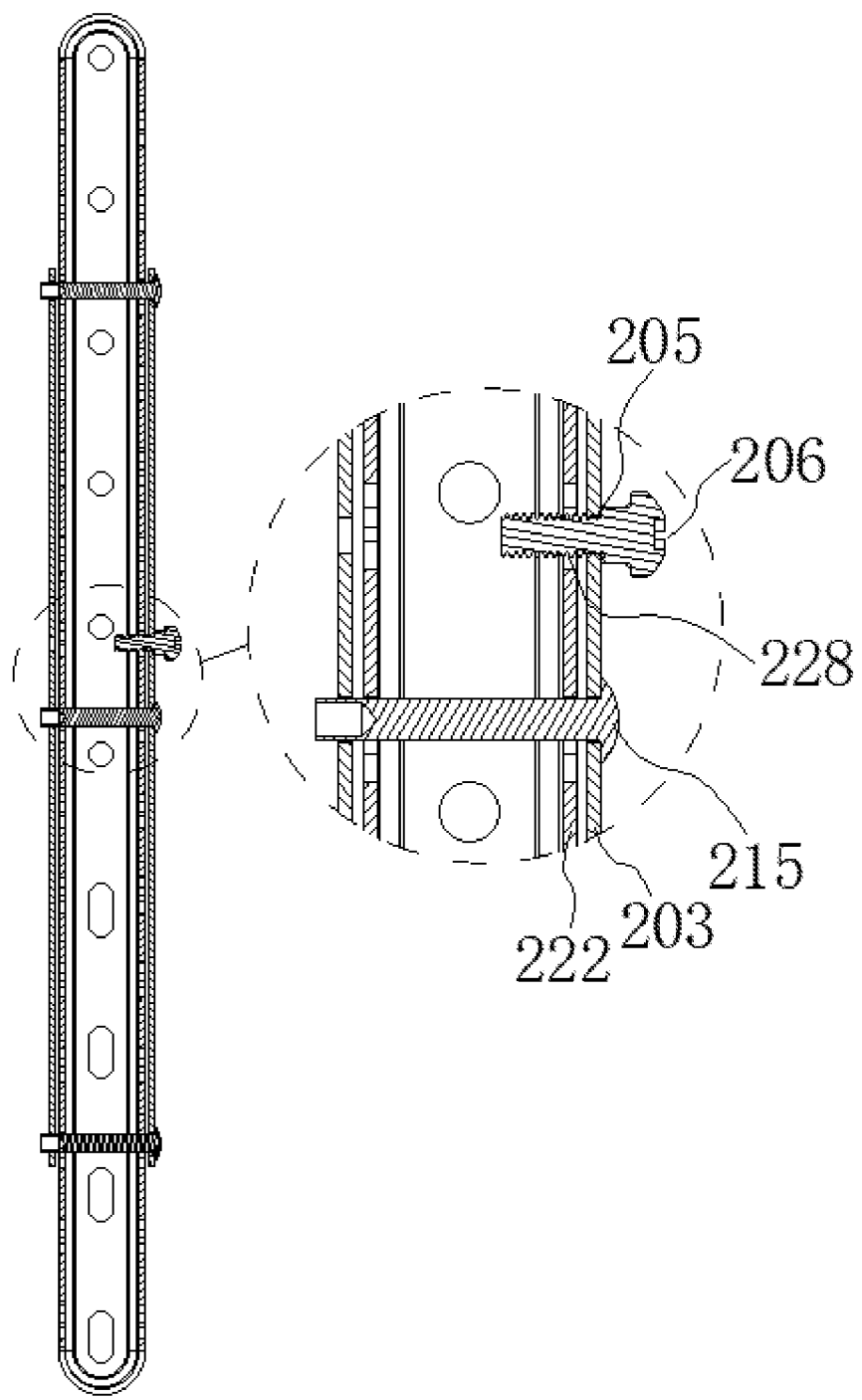
FIG. 10 is a sectional view showing a locked state of the first hanging plate and the second hanging plate according to the embodiment of FIG. 1.

As shown in FIG. 9, the first folding wings 203 of the first hanging plate 21 are adjacently provided with hanging column fixing holes 204 and the locking holes 205, the hanging column fixing holes 204 are used to arrange the hanging columns 215, and the locking holes 205 are used for the second fixture 206 to pass through, and most preferably, they are in screw fit to prevent the second fixture 206 from accidentally falling off. Therefore, the second fixture 206 and the hanging columns 215 are fitted into different hanging holes 223 which may be arranged adjacently as shown or may be arranged at intervals of several hanging holes 223.

After the second fixture 206 is mounted, the audiovisual device is completely fixed on the second hanging plate 22.

In other embodiments, the second fixture 206 may not be fitted into the hanging holes 223 to be limited, but cylindrical or square limit through holes through which the second fixture 206 passes may be additionally provided on the second folding wings 222 of the second hanging plate 22 to serve as locking limiting portions, which also achieves the purpose of locking the two hanging plates 21 and 22 relative to each other. At this time, the second fixture 206 alone can achieve relative locking between the hanging plates 21 and 22.

The audiovisual device support and the hanging plate assembly thereof according to the present invention have the following beneficial effects:

The first hanging plate is connected to the frame by the upper and lower fixtures, and is preferably fixed to the upper and lower cross bars of the frame by an upper and lower fixing structure having a hook portion at an upper portion and a cross bar at a lower portion, which facilitates mounting process.

The relative distance between the two first hanging plates on the upper and lower cross bars can be adjusted, and the upper portion of each first hanging plate is hooked to the upper cross bar by the hook portion, and the lower portion is fixed to the lower cross bar by the first fixture, so that a distance between the two hanging plate assemblies can be set as required to meet mounting requirements of different brands or sizes of audiovisual devices.

The fixing height of the second hanging plate relative to the first hanging plate is adjustable, so that a mounting height of the audiovisual device can be easily adjusted. Furthermore, the height adjusting mechanism has a simple structure, is easy to use, is stable when connected, and is not easy to fall off.

After the second hanging plate is arranged at a desired height position, the second fixture passes through the first hanging plate to limit the first hanging plate, so that the second hanging plate is fixed to the first hanging plate without falling off even when subjected to a bottom-up impact force.

The support also has moving wheels to facilitate overall movement, and the support can also receive wires, mounting aids, and store objects.

During mounting, a scale may be used to assist in determining the mounting height or levelness of the audiovisual device.

What is claimed is:

1. An audiovisual device support, comprising:
 a support frame to be placed on a support surface, wherein the support frame comprises an upper cross bar and a lower cross bar arranged horizontally at intervals;

a hanging plate assembly, wherein the hanging plate assembly comprises a first hanging plate and a second hanging plate detachably connected, the first hanging plate is connected to the upper cross bar and the lower cross bar so that the first hanging plate is fixed to the support frame, and the second hanging plate is used to be connected with an audiovisual device; the first hanging plate comprises a first connecting wing and first folding wings located on both sides of the first connecting wing, hanging columns are provided between the two first folding wings, the second hanging plate comprises a second connecting wing and second folding wings located on both sides of the second connecting wing, at least two sets of hanging holes are provided on the two second folding wings, and the hanging holes are arranged at corresponding positions of the two second folding wings; the hanging holes comprise communicating holes and limiting holes, one end of the respective limiting hole is closed, the other end thereof is in communication with the outside through the communicating holes, and the hanging columns are fitted into the limiting holes after passing through the communicating holes so as to connect the second hanging plate to the first hanging plate; and a second fixture, wherein the second fixture passes through locking holes arranged on the first folding wings and then is fitted into locking limiting portions arranged on the second folding wings to prevent the hanging columns from falling out of the limiting holes and lock the second hanging plate relative to the first hanging plate; and wherein the hanging holes are arranged at intervals generally along a length direction of the second hanging plate, so that when the hanging columns are fitted into different ones of the hanging holes, the audiovisual device can be presented at different fixing heights relative to the support surface; after the second fixture is separated from the locking limiting portions, the hanging columns can be switched among the hanging holes to adjust the fixing height of the audiovisual device; and the second hanging plate can be locked relative to the first hanging plate by fitting the second fixture into the locking limiting portions after the hanging columns are fitted into one of the hanging holes.

2. The audiovisual device support according to claim 1, wherein the hanging columns are horizontally arranged fixed columns, both ends of the fixed columns are fixed to the two first folding wings; the communicating holes are obliquely arranged on the second folding wings, outer ends of the communicating holes are formed as openings of the hanging holes, and inner ends thereof are in communication with the limiting holes; and the first hanging plate or the second hanging plate is formed by bending a metal base material.

3. The audiovisual device support according to claim 2, wherein the second hanging plate is accommodated between the two first folding wings of the first hanging plate; and there are three hanging columns which are respectively arranged at an upper end, a middle portion and a lower end of the first hanging plate.

4. The audiovisual device support according to claim 2, wherein the second fixture is a screw, the screw is in screw fit with the locking holes; the locking limiting portions are locking limiting walls, the locking limiting walls are formed by side walls of the hanging holes at junctions of the communicating holes and the limiting holes, and the locking limiting walls abut against a lower wall of the second fixture, so that the second fixture cooperates with the hanging columns to lock the second hanging plate relative to the first hanging plate.

5. The audiovisual device support according to claim 4, wherein the support frame further comprises two upright columns arranged vertically at intervals, and the upper cross bar and the lower cross bar are fixed to the two upright columns;

the first hanging plate comprises a first hanging plate body, the first connecting wing and the first folding wings are formed on the first hanging plate body, and the first hanging plate body is further provided with an upper fixture for connecting with the upper cross bar and a lower fixture for connecting with the lower cross bar so as to fix the first hanging plate body to the two cross bars; a hook portion for hooking the upper cross bar is provided at the upper fixture, and the lower fixture is fitted to the lower cross bar and fixed by a first fixture; or the upper fixture and the lower fixture are respectively fixed to the upper cross bar and the lower cross bar by the first fixture.

6. The audiovisual device support according to claim 5, wherein the support frame is further provided with an object storage plate and a wire receiving member, and a bottom of the support frame is provided with moving wheels; the second hanging plate is further provided with several first fixing holes or second fixing holes, the first fixing holes are circular through holes, and the second fixing holes are elongated through holes; and the support frame or the hanging plate assembly is further provided with a scale or an auxiliary support, the scale is provided with graduations, and the auxiliary support is used to mount an auxiliary device.

7. An audiovisual device support, comprising:

a support frame to be placed on a support surface;

a hanging plate assembly, wherein the hanging plate assembly further comprises a first hanging plate and a second hanging plate detachably connected, the first hanging plate is fixed to the support frame, the second hanging plate is used to be connected with an audiovisual device; the first hanging plate is provided with a first connecting portion, the second hanging plate is provided with at least two sets of second connecting portions, the second connecting portions comprise communicating holes and limiting holes, one end of the respective limiting hole is closed, the other end thereof is in communication with the outside through the communicating holes, and the first connecting portion is fitted into the limiting holes after passing through the communicating holes so as to connect the second hanging plate to the first hanging plate; and a second fixture, wherein the second fixture passes through a locking hole arranged on the first hanging plate and then is fitted into a locking limiting portion arranged on the second hanging plate to prevent the first connecting portion from falling out of the second connecting portions and lock the second hanging plate relative to the first hanging plate; and wherein the second connecting portions are arranged at intervals generally along a length direction of the second hanging plate, so that when the first connecting portion is fitted into different second connecting portions, the audiovisual device can be presented at different fixing heights relative to the support surface; after the second fixture is separated from the locking limiting portion, the first connecting portion can be arbitrarily switched among the second connecting portions to adjust the fixing height of the audiovisual device; and the second hanging plate can be locked relative to the first hanging plate by fitting the second fixture into the locking limiting portion after the first connecting portion is fitted into one of the second connecting portions.

8. The audiovisual device support according to claim 7, wherein the second fixture is a screw, the screw is in screw fit with the locking hole; the locking limiting portion is a locking limiting wall, the locking limiting wall is formed by a side wall of one of the second connecting portions, and the locking limiting wall abuts against the second fixture so as to undetachably lock the second hanging plate relative to the first hanging plate.

9. The audiovisual device support according to claim 7, wherein the second fixture is a screw, the screw is in screw fit with the locking hole; the locking limiting portion is a limiting through hole arranged on the second hanging plate, and the second fixture is fitted into the limiting through hole after passing through the locking hole so as to undetachably lock the second hanging plate relative to the first hanging plate.

10. The audiovisual device support according to claim 8, wherein the first connecting portion is a horizontally arranged fixed column, both ends of the fixed column are fixed to the first hanging plate; the communicating holes are obliquely arranged on the second hanging plate, outer ends of the communicating holes are formed as openings of the hanging holes, and inner ends thereof are in communication with the limiting holes.

11. The audiovisual device support according to claim 10, wherein the support frame comprises two upright columns arranged vertically at intervals and an upper cross bar and a lower cross bar arranged horizontally at intervals; the first hanging plate comprises a first hanging plate body, the first connecting portion is arranged on the first hanging plate body, and the first hanging plate body is further provided with an upper fixture for connecting with the upper cross bar and a lower fixture for connecting with the lower cross bar so as to fix the first hanging plate body to the two cross bars.

12. A hanging plate assembly for an audiovisual device support, comprising
a first hanging plate, wherein the first hanging plate is fixed on a support frame of an audiovisual device support, the first hanging plate comprises a first connecting wing and first folding wings located on both sides of the first connecting wing, and hanging columns are provided between the two first folding wings;
a second hanging plate detachably connected with the first hanging plate, wherein the second hanging plate is used to be connected with an audiovisual device; the second hanging plate comprises a second connecting wing and second folding wings located on both sides of the second connecting wing, at least two sets of hanging holes are provided on the two second folding wings, the hanging holes comprise communicating holes and limiting holes, one end of the respective limiting hole is closed, the other end thereof is in communication with the outside through the communicating holes, and the hanging columns are fitted into the limiting holes after passing through the communicating holes to connect the second hanging plate to the first hanging plate; and
a second fixture, wherein the second fixture passes through locking holes arranged on the first folding wings and then is fitted into locking limiting portions arranged on the second folding wings to prevent the hanging columns from falling out of the hanging holes and lock the second hanging plate relative to the first hanging plate; and
wherein the hanging holes are arranged at intervals generally along a length direction of the second hanging plate, so that when the hanging columns are fitted into different ones of the hanging holes, the audiovisual device can be presented at different fixing heights; after the second fixture is separated from the locking limiting portions, the hanging columns can be arbitrarily switched among the hanging holes to adjust the fixing height of the audiovisual device; and the second hanging plate can be locked relative to the first hanging plate by fitting the second fixture into the locking limiting portions after the hanging columns are fitted into one of the hanging holes.

13. The hanging plate assembly for an audiovisual device support according to claim 12, wherein the communicating holes are obliquely arranged on the second folding wings, and outer ends of the communicating holes are formed as openings of the hanging holes, and inner ends thereof are in communication with the limiting holes.

14. A hanging plate assembly for an audiovisual device support according to claim 13, wherein the first hanging plate body or the second hanging plate is formed by bending a metal base material.

15. The hanging plate assembly for an audiovisual device support according to claim 13, wherein the second fixture is a screw, and the screw is in screw fit with the locking holes.

16. The hanging plate assembly for an audiovisual device support according to claim 15, wherein the locking limiting portions are limiting through holes arranged on the second folding wings, and the second fixture is fitted into the limiting through holes after passing through the locking holes so as to lock the second hanging plate relative to the first hanging plate.

17. The hanging plate assembly for an audiovisual device support according to claim 15, wherein the locking limiting portions are locking limiting walls, the locking limiting walls are formed by side walls of the hanging holes at junctions of the communicating holes and the limiting holes, and the locking limiting walls abut against a lower wall of the second fixture, so that the second fixture cooperates with the hanging columns to lock the second hanging plate relative to the first hanging plate.

18. The hanging plate assembly for an audiovisual device support according to claim 14, wherein the hanging columns are horizontally arranged fixed columns, there are three fixed columns which are respectively arranged at an upper end, a middle portion and a lower end of the first hanging plate body, and both ends of the fixed columns are fixed on the first folding wings; and the second hanging plate is accommodated between the first folding wings of the first hanging plate.

19. The hanging plate assembly for an audiovisual device support according to claim 14, wherein the first hanging plate comprises a first hanging plate body, an upper fixture and a lower fixture, the first connecting wing and the first folding wings are arranged on the first hanging plate body; a hook portion for hooking to an upper cross bar of the support frame is formed on the upper fixture, and the lower fixture is a cross bar for the first fixture to fix the lower fixture to a lower cross bar of the support frame.

20. The hanging plate assembly for an audiovisual device support according to claim 14, wherein the second connecting wing is provided with several first fixing holes or second fixing holes for fixed connection of the audiovisual device, the first fixing holes are circular through holes, and the second fixing holes are elongated through holes.

\* \* \* \* \*